July 22, 1958 W. J. McCANLESS 2,843,953
MOTOR VEHICLE SKID RAIL CONSTRUCTION
Filed Sept. 8, 1954
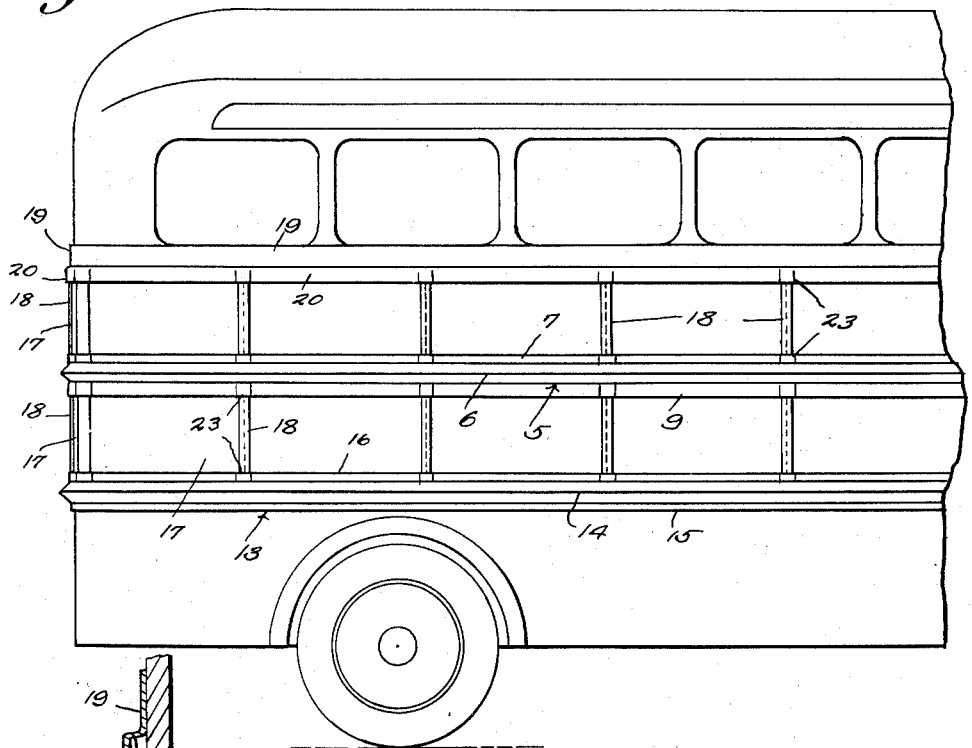
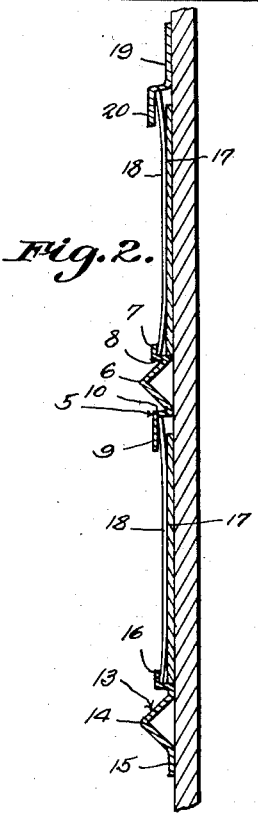
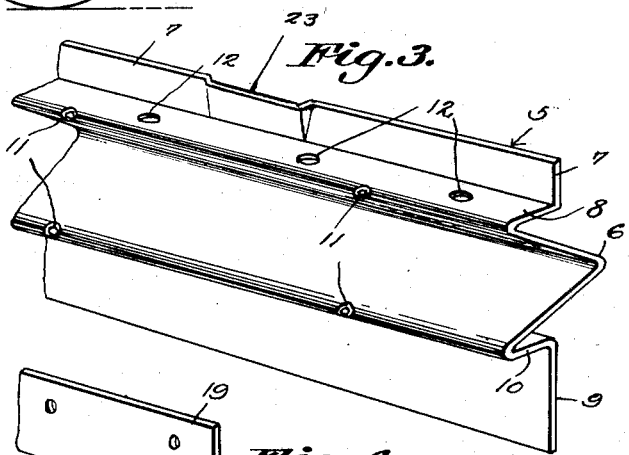
William J. McCanless
INVENTOR
BY
ATTORNEYS.

United States Patent Office 2,843,953
Patented July 22, 1958

2,843,953
MOTOR VEHICLE SKID RAIL CONSTRUCTION

William J. McCanless, Asheville, N. C.

Application September 8, 1954, Serial No. 454,760

1 Claim. (Cl. 40—129)

This invention relates to motor vehicle skid rail construction, the primary object of the invention being to provide skid rails of the type used in bus construction, which are so constructed and arranged that advertising cards, thin-gauge sheet metal advertising plates or the like, may be readily positioned and held therein, thereby utilizing what otherwise would be wasted space, for displaying advertising matter.

Another object of the invention is to provide a dual purpose for the skid rails of motor driven buses, trolley buses, street cars or the like, wherein the advertising cards or plates may be secured in position by frictional contact with flanges of said skid rails.

Still another object of the invention is to provide skid rails which are of a particular design to provide ample protection against damage to the cards or advertising plates supported therein, by closely moving vehicles.

A further object of the invention is to provide flanges on the skid rails which are so spaced from the vehicle that the usual metal securing strips used in removably securing advertising cards or plates to the rails, may be held.

With the foregoing and other objects in view which will appear as the description proceeds, the invention consists of certain novel details of construction and combinations of parts, hereinafter more fully described and pointed out in the claim, it being understood that changes may be made in the construction and arrangement of parts without departing from the spirit of the invention as claimed.

Referring to the drawing:

Figure 1 is a fragmental elevation view of a bus equipped with skid rails constructed in accordance with the invention.

Figure 2 is a fragmental vertical sectional view illustrating the manner of securing display cards under the flanges of the skid rail.

Figure 3 is a fragmental perspective view of a skid rail.

Figure 4 is a fragmental elevational view of an upper skid rail embodying a single supporting flange.

Figure 5 is a perspective view illustrating the type of skid rail used at the lower edge of an advertising card or plate and illustrating a modified form of such rail.

Referring to the drawing in detail, the reference character 5 indicates a skid rail used in protecting the body of a bus, street cars or the like, which is secured to the outer surface of the bus, the skid rail extending along the body of the bus.

The skid rail is constructed preferably of a length of sheet metal material bent intermediate its side edges providing a substantially V-shaped outwardly extended central portion 6 disposed longitudinally of the skid rail.

The outwardly extended central portion 6 extends a substantial distance beyond the body of the bus or vehicle to which it is secured, providing a protecting rail or skid rail to prevent damage to the body of the car by closely moving vehicles.

Extending longitudinally of the skid rail and formed integral with one edge thereof, is a laterally and upwardly extended flange 7, the laterally extended portion 8 being substantially shorter than the central portion 6, so that the central portion 6 extends beyond the flange 7, as better shown by Figure 2 of the drawing.

Formed along the lower edge of the skid rail is a flange 9 that extends longitudinally of the skid rail and is connected with the central portion 6 by means of the laterally extended portion 10, the laterally extended portion 10 being substantially shorter than the central portion 6, for purposes to be more fully hereinafter described.

Openings 11 are formed in the rail for the reception of securing bolts or screws by means of which the skid rail may be secured to the outer surface of the bus body.

Because of the construction of the skid rail 5, the flanges 7 and 9 are spaced from the outer surface of the body of the bus as shown by Figure 2, providing flanges for supporting display cards or plates.

Drain openings 12 are provided along the laterally etxended portion 8 so that water collecting on the laterally extended portion 8 may drain therefrom without damage to the display card or plate supported thereby.

A second skid rail is used in supporting display cards or plates, and this rail is indicated generally by the reference character 13, the rail 13 being also formed of a length of sheet metal material bent longitudinally intermediate its side edges providing a substantially V-shaped outwardly projecting section 14. Formed integral with the skid rail 13 and disposed longitudinally of its lower edge, is a laterally extended flange 15 which is provided with bolt or screw openings for receiving bolts or screws for securing the skid rail to the body of a bus or the like.

The skid rail 13 is also extended around the body of the bus and secured in a horizontal position spaced above the central skid rail 5. Formed along the other longitudinal edge of the skid rail 13 is a laterally and upwardly extended flange 16 which is so constructed and arranged that when the skid rail 13 is properly positioned as shown by Figure 2, this flange 16 will lie in spaced relation with the body of the car and directly opposite to the flange 9 of the skid rail 5. It might be stated that the flange 16 is appreciably narrower than the flange 9, so that a card or plate to be held between the flanges 16 and 9 may be dropped with its lower edge between the flange 16 and body of the car, and the card or plate bent with its upper edge resting directly under the wide flange 9 of the skid rail 5. The card is now released and, owing to its resiliency, the card or plate will expand to a position under the flanges 16 and 9. The card in the present showing is indicated by the reference character 17 and is further held in position by means of the usual flexible metal securing strips 18 which are positioned under the flanges 9 and 16 in a similar manner.

The reference character 19 indicates an upper securing strip which is provided with an offset flange 20 which is of a width substantially greater than the width of the flange 7 of the skid rail 5, and is disposed towards the flange 7 and better shown by Figure 2. This securing strip 19 is positioned in vertical spaced relation with respect to the skid rail 5 and is also spaced from the outer surface of the body of the car so that an advertising or display card indicated at 17 may be held thereunder. A metal securing strip such as indicated at 18 is also positioned against the card or advertising plate held between the skid rail and strip 19.

Each of the skid rails is provided with offset portions 23 that provide pockets in which the ends of the flexible metal securing strips 18 may be positioned and held against moving from their proper card or plate holding positions.

As shown by Figure 5 of the drawing, a securing strip comprising a length of sheet metal, indicated at 21 is provided, one longitudinal edge thereof being extended laterally in spaced relation with the body 21 providing a supporting flange 22 into which the lower edge of advertising or display cards may be positioned securely holding the advertising cards or plates between the flanges 20 and 22. It will of course be understood that in this form of the invention, the body portion or strip 21 will be used in lieu of the lower skid rail 13 as illustrated by Figure 2 of the drawing.

From the foregoing it will be seen that due to the construction shown and described, I have provided skid or guard rails for the bodies of motor buses, trolley buses or street cars or the like which will have the dual purpose of protecting the body of the car against closely moving vehicles, and at the same time provide means for supporting advertising cards or plates, utilizing the space between skid rails secured on the outer surface of the body, which space is otherwise wasted.

Having thus described the invention what is claimed is:

A frame for supporting advertising cards adapted to be secured to the exterior surface of a vehicle body, comprising spaced upper and lower horizontal flanged rails, a central sheet metal horizontal rail comprising a central portion of V-shaped cross section adapted to have its apex extend outwardly from said vehicle body, forming grooves between said apex and said horizontal flanges, said grooves having spaced apertures therein for the reception of securing bolts, upper and lower horizontal flanges extending outwardly from the ends of the legs of the V, vertical flanges extending from the edges of said horizontal flanges and spaced from said surface, and spaced offset portions formed in said vertical flanges.

References Cited in the file of this patent
UNITED STATES PATENTS

| | | |
|---|---|---|
| 133,158 | Kuh | Nov. 19, 1872 |
| 210,595 | Burnhams | Dec. 10, 1878 |
| 815,946 | Ettenger | Mar. 27, 1906 |
| 1,743,913 | Connell | Jan. 14, 1930 |
| 2,188,021 | Thompson | Jan. 23, 1940 |
| 2,293,642 | Donaldson | Aug. 18, 1942 |